United States Patent
He et al.

(10) Patent No.: US 11,966,123 B2
(45) Date of Patent: Apr. 23, 2024

(54) DEVICE AND METHOD FOR PHOTO ALIGNMENT

(71) Applicant: HKC CORPORATION LIMITED, Shenzhen (CN)

(72) Inventors: Jing He, Shenzhen (CN); Sihui Yu, Shenzhen (CN)

(73) Assignee: HKC CORPORATION LIMITED, Shenzhen (CN)

(*) Notice: Subject to any disclaimer, the term of this patent is extended or adjusted under 35 U.S.C. 154(b) by 0 days.

(21) Appl. No.: 18/002,161

(22) PCT Filed: Dec. 30, 2021

(86) PCT No.: PCT/CN2021/143354
§ 371 (c)(1),
(2) Date: Dec. 16, 2022

(87) PCT Pub. No.: WO2022/199191
PCT Pub. Date: Sep. 29, 2022

(65) Prior Publication Data
US 2023/0314878 A1    Oct. 5, 2023

(30) Foreign Application Priority Data

Mar. 22, 2021 (CN) .......................... 202110302205.5

(51) Int. Cl.
*G02F 1/1333* (2006.01)
*G02F 1/01* (2006.01)
(Continued)

(52) U.S. Cl.
CPC ...... *G02F 1/133788* (2013.01); *G02F 1/0136* (2013.01); *G02F 1/133331* (2021.01);
(Continued)

(58) Field of Classification Search
CPC ............. G02F 1/133788; G02F 1/0136; G02F 1/133331; G02F 1/13336; G02F 1/133617;
(Continued)

(56) References Cited

U.S. PATENT DOCUMENTS

| 2004/0008310 A1 | 1/2004 | Leidig et al. |
| 2012/0086893 A1 | 4/2012 | Ou et al. |
| 2016/0109760 A1* | 4/2016 | Finnemeyer ...... G02F 1/133377 349/123 |

FOREIGN PATENT DOCUMENTS

| CN | 103403614 A | 11/2013 |
| CN | 103728780 A | 4/2014 |
(Continued)

OTHER PUBLICATIONS

English Machine Translation of Park et al, KR-20170015799 (Year: 2023).*
(Continued)

*Primary Examiner* — Donald L Raleigh
(74) *Attorney, Agent, or Firm* — Maier & Maier, PLLC

(57) ABSTRACT

A device for photo alignment includes: a bearing platform; a linearly polarized light source located at one side of the bearing platform; and a control assembly located between the linearly polarized light source and the bearing platform. One side of the bearing platform close to the control assembly is configured for placing a large plate glass to be aligned, and the large plate glass to be aligned includes a plurality of alignment areas; the linearly polarized light source is configured for providing a first polarized light to the control assembly; the control assembly is configured for adjusting a polarization direction of the first polarized light, and configured for providing a second polarized light to the plurality of alignment areas included in the large plate glass
(Continued)

to be aligned; and polarization directions of the second polarized light respectively corresponding to at least two alignment areas are different.

13 Claims, 6 Drawing Sheets

(51) Int. Cl.
*G02F 1/13357* (2006.01)
*G02F 1/1337* (2006.01)
*G02F 1/1343* (2006.01)
*G02F 1/137* (2006.01)

(52) U.S. Cl.
CPC .... *G02F 1/13336* (2013.01); *G02F 1/133617* (2013.01); *G02F 1/13362* (2013.01); *G02F 1/134309* (2013.01); *G02F 1/137* (2013.01)

(58) Field of Classification Search
CPC . G02F 1/13362; G02F 1/134309; G02F 1/137
See application file for complete search history.

(56) References Cited

FOREIGN PATENT DOCUMENTS

| CN | 105372879 | A |   | 3/2016 |   |            |
|----|-----------|---|---|--------|---|------------|
| CN | 107255891 | A |   | 10/2017 |   |           |
| CN | 108761927 | A |   | 11/2018 |   |           |
| CN | 108873489 | A |   | 11/2018 |   |           |
| CN | 111552124 | A |   | 8/2020 |   |            |
| JP | 2001066602 | A |   | 3/2001 |   |           |
| JP | 2010091906 | A |   | 4/2010 |   |           |
| JP | 2017215613 | A |   | 12/2017 |   |          |
| KR | 19990006951 | A | * | 1/1999 | .......... | G02F 1/1337 |
| KR | 20170015799 |   | * | 2/2017 | .......... | G02F 1/1333 |

OTHER PUBLICATIONS

English Machine Translation of Park et al, KR 19990006951 (Year: 2023).*

* cited by examiner

DEVICE AND METHOD FOR PHOTO ALIGNMENT

CROSS REFERENCE TO RELATED APPLICATION

This application is a National Stage Appl. of International Patent Application No. PCT/CN2021/143354 with an international filing date of Dec. 30, 2021 designating the United States, now pending, and further claims foreign priority benefits to Chinese Patent Application No. 202110302205.5, filed on Mar. 22, 2021. The contents of all of the aforementioned applications, including any intervening amendments thereto, are incorporated herein by reference.

TECHNICAL FIELD

The present application relates to the technical field of display, and more particularly to a device and a method for photo alignment.

BACKGROUND

Liquid Crystal Display (LCD) has the advantages of low radiation, small size and low power consumption, and the LCD is widely used in various electronic devices such as notebook computers and TVs. The liquid crystal display panel usually includes an array substrate, a color filter substrate, a liquid crystal (LC) sandwiched between the array substrate and the color filter substrate, and a sealant, etc.

In the preparation process, firstly, usually several array substrates are prepared on the first large plate glass and several color filter substrates are prepared on the second large plate glass, and then the array substrates and the color filter substrates on the two large plate glasses are aligned to form a liquid crystal display panel.

Usually, before the aligning, the alignment film is needed to be coated on the array substrate and the color filter substrate respectively, and then the rubbing alignment process is used to process the alignment film, so that the alignment film has the ability to make the liquid crystal molecules follow a uniform direction at a certain pre-tilt angle. However, the above method is only applicable to the case where the alignment directions are uniform, when the liquid crystal molecules corresponding to several array substrates arranged on the large plate glass need different alignment directions. The difficulty of rubbing alignment process is increased, and the preparation process is no longer applicable.

Therefore, a device that is simple to implement and can precisely control the alignment direction of the liquid crystal is need.

SUMMARY

Embodiments of present application provide a device and a method for photo alignment, which can realize the simultaneous alignment of a plurality of array substrates or a plurality of color filter substrates requiring alignment directions of different liquid crystals, the process is simple and the time is short.

According to a first aspect of the present application, a device for photo alignment is provided, the device includes: a bearing platform; a linearly polarized light source, located at one side of the bearing platform; and a control assembly, located between the linearly polarized light source and the bearing platform; one side of the bearing platform close to the control assembly is configured for placing a large plate glass to be aligned, and the large plate glass to be aligned including a plurality of alignment areas; the linearly polarized light source is configured for providing a first polarized light to the control assembly; the control assembly is configured for adjusting a polarization direction of the first polarized light, and configured for providing a second polarized light to the plurality of alignment areas included in the large plate glass to be aligned; and polarization directions of the second polarized light respectively corresponding to at least two alignment areas are different.

In the device for photo alignment provided by the first aspect, by arranging the control assembly between the linearly polarized light source and the bearing platform, after placing the large plate glass to be aligned on the side of the bearing platform close to the control assembly, the control assembly can adjust the polarization direction of the first polarized light emitted by the linearly polarized light source, so as to provide the second polarized light to the plurality of alignment areas included in the large plate glass to be aligned. Since the polarization directions of the second polarized light corresponding to the at least two alignment areas are different, alignment areas corresponding to different alignment directions can be generated, therefore the control assembly can be used to achieve alignment in a plurality of directions at the same time.

In addition, compared with the prior art, when the device for photo alignment provided by the embodiment of the present application is used for alignment, the process is simple, the time is short, the precision is high, and the work efficiency is also high.

In an implementation of the first aspect, one side of the large plate glass to be aligned close to the control assembly is coated with an alignment film; and the second polarized light is configured for aligning the alignment film located in the alignment areas on the large plate glass to be aligned. In the implementation, the alignment films in the corresponding alignment areas are aligned by the provided second polarized light, so that the alignment films in different alignment areas have alignment capabilities in different directions.

In an implementation of the first aspect, a plurality of array substrates are arranged on the large plate glass to be aligned, and each array substrate includes at least one alignment area; or a plurality of color filter substrates are arranged on the large plate glass to be aligned, and each color filter substrate includes at least one alignment area. In the implementation, alignment in different directions is possible regardless of the number of alignment areas.

In an implementation of the first aspect, the control assembly includes a plurality of control modules, and the control modules and the alignment areas on the large plate glass to be aligned are in one-to-one correspondence; and the control modules are configured for adjusting the polarization direction of the first polarized light corresponding to the alignment areas to form the second polarized light. In the implementation, each control module adjusts an alignment direction of one alignment area. Therefore, by adjusting the polarization directions of the first polarized light in the corresponding alignment areas by different control modules, the second polarized light with different polarization directions can be generated.

In an implementation of the first aspect, each control module includes: a first substrate and a second substrate that are oppositely arranged, and an alignment liquid crystal layer located between the first substrate and the second substrate, the first substrate being parallel to the bearing platform; an alignment electrode layer is provided on one side of the first substrate close to the alignment liquid crystal layer, or on one side of the second substrate close to the alignment liquid crystal layer, the alignment electrode layer is configured for supplying a voltage to the alignment liquid crystal layer, and the voltage is configured for controlling a liquid crystal in the alignment liquid crystal layer to rotate, and a rotated liquid crystal is configured for adjusting the polarization direction of the first polarized light. In the implementation, the liquid crystal in the alignment liquid crystal layer is controlled by voltage to rotate, and the rotated liquid crystal adjusts the polarization direction of the first polarized light.

In an implementation of the first aspect, the alignment electrode layer includes: a first electrode and a second electrode arranged at intervals, the first electrode and the second electrode are both parallel to the bearing platform; and the first electrode is configured for supplying a first voltage to the alignment liquid crystal layer, and the second electrode is configured for supplying a second voltage to the alignment liquid crystal layer. In the implementation, the voltage different between the first voltage and the second voltage controls the rotation angle of the liquid crystal, so that the polarization direction of the first polarized light can be adjusted.

In an implementation of the first aspect, the linearly polarized light source includes: an ultraviolet light source, a filter, and a polarizer that are stacked in sequence; and the polarizer is located on one side of the ultraviolet light source close to the control assembly; the filter is configured for filtering an ultraviolet light with a preset wavelength in the ultraviolet light provided by the ultraviolet light source, and the polarizer is configured for converting a filtered Ultraviolet light into the first polarized light.

In an implementation of the first aspect, a first preset distance is provided between the linearly polarized light source and the control assembly.

In an implementation of the first aspect, a second preset distance is provided between the bearing platform and the control assembly.

In an implementation of the first aspect, the control assembly is parallel to the bearing platform and the large plate glass to be aligned, and a side length of the control assembly along any direction is greater than or equal to a side length of the large plate glass to be aligned in a corresponding direction.

In an implementation of the first aspect, a projection of the linearly polarized light source on the control assembly is located at a center of the control assembly.

In an implementation of the first aspect, a photosensitive agent is coated on a side of the alignment film close to the control assembly.

According to a second aspect of the present application, a method for photo alignment is provided, placing a large plate glass to be aligned comprising a plurality of alignment areas on one side of a bearing platform close to a control assembly; providing a first polarized light to the control assembly through a linearly polarized light source; and providing a second polarized light to the plurality of alignment areas included in the large plate glass to be aligned, after adjusting a polarization direction of the first polarized light through the control assembly; polarization directions of the second polarized light respectively corresponding to at least two alignment areas are different.

In an implementation of the second aspect, an alignment film is coated on one side of the large plate glass to be aligned close to the control assembly; and performing aligning at the alignment film located in the alignment areas on the large plate glass to be aligned through the second polarized light. In the implementation, the alignment films in the corresponding alignment areas are aligned by the provided second polarized light, so that the alignment films in different alignment areas have alignment capabilities in different directions.

According to a third aspect of the present application, a computer-readable storage medium is provided, and the computer-readable storage medium is stored with computer programs or instructions, when the computer programs or instructions are read and executed, the method for photo alignment as in the above second aspect or any possible implementation of the second aspect is executed by a computer.

The embodiments of the present application provide a device and a method for photo alignment, by arranging the control assembly between the linearly polarized light source and the bearing platform, after placing the large plate glass to be aligned on the side of the bearing platform close to the control assembly, the control assembly can adjust the polarization direction of the first polarized light emitted by the linearly polarized light source, so as to provide the second polarized light to the plurality of alignment areas included in the large plate glass to be aligned. Since the polarization directions of the second polarized light corresponding to the at least two alignment areas are different, alignment areas corresponding to different alignment directions can be generated, therefore the control assembly can be used to achieve alignment in a plurality of directions at the same time.

In addition, compared with the prior art, when the device for photo alignment provided by the embodiment of the present application is used for alignment, the process is simple, the time is short, the precision is high, and the work efficiency is also high.

BRIEF DESCRIPTION OF THE DRAWINGS

In order to illustrate the technical solutions of the embodiments of the present application more clearly, the following briefly introduces the accompanying drawings used in the description of the embodiments. For those skilled in the art, other drawings can also be obtained from these drawings without any creative effort.

Figure 1:
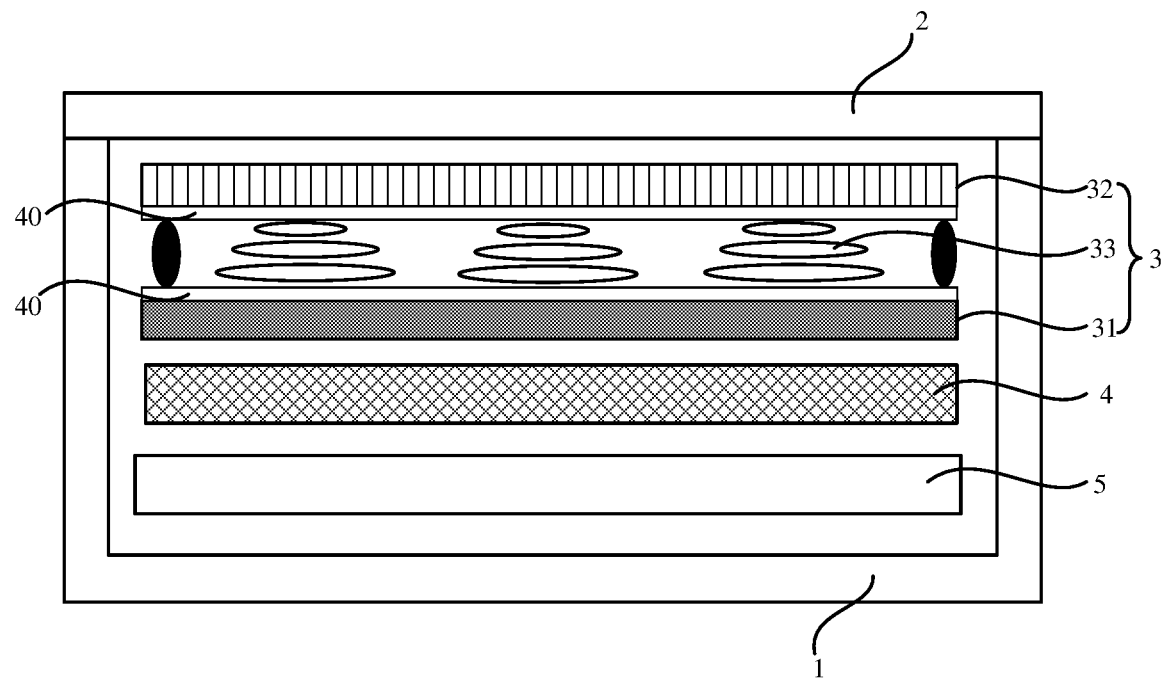
FIG. 1 is a schematic structural view of a liquid crystal display device.

The realization, functional characteristics and advantages of the purpose of the present application will be further described with reference to the accompanying drawings in conjunction with the embodiments.

DETAILED DESCRIPTION OF THE EMBODIMENTS

In order to make the purpose, technical solutions and advantages of the present application more clearly understood, the present application will be described in further detail below with reference to the accompanying drawings and embodiments. It should be understood that the specific embodiments described herein are only used to explain the present application, but not to limit the present application.

Unless otherwise defined, technical or scientific terms used in the present application shall have the ordinary meaning as understood by those skilled in the art. The terms "first", "second", "third", "fourth" and similar terms used in the description and claims of the present application do not denote any order, quantity or importance, but are only used to distinguish different components. Thus, features defined as "first", "second", "third", "fourth" may expressly or implicitly include one or more of such features. In the description of the embodiments of the present application, unless otherwise specified, "a plurality of" means two or more.

Orientation terms such as "left", "right", "upper" and "lower" are defined relative to the orientation in which the display components are schematically placed in the drawings, and it should be understood that these directional terms are relative concepts, and they are used for the description and clarification of the relative, which may change correspondingly according to the change of the orientation of the array substrate or the display device.

The embodiments of the present application provide a liquid crystal display device, and the liquid crystal display device can be various electronic devices or the liquid crystal display device can be applied to various electronic devices.

In some embodiments, the electronic devices may be various types of electronic devices such as smart phones, tablet computers, electronic readers, in-vehicle computers, navigators, digital cameras, smart TVs, and smart wearable devices. The embodiments of the present application do not impose any limitation on this.

In the prior art, most of the liquid crystal display devices are backlight type liquid crystal display devices, and FIG. 1 shows a schematic structural view of a backlight type liquid crystal display device. As shown in FIG. 1, the main structure of the liquid crystal display device includes a frame 1, a cover plate 2, a liquid crystal display panel 3, a backlight module 4, a circuit board 5, and other electronic accessories including a camera, etc. The liquid crystal display panel 3 includes an array substrate 31, an opposite substrate, and a liquid crystal layer 33 disposed between the array substrate 31 and the opposite substrate. The array substrate 31 and the opposite substrate are joined together by a sealant, so as to seal the liquid crystal layer 33 into the area enclosed by the sealant. In an embodiment, the color filter layer is usually disposed on the opposite substrate, and the opposite substrate is referred to as the color filter substrate 32.

As shown in FIG. 1, taking the U-shaped longitudinal section of the frame 1 as an example, the liquid crystal display panel 3, the backlight module 4, the circuit board 5 and other electronic accessories including cameras are arranged in the frame 1, and the backlight module 4 is located below the liquid crystal display panel 3, the circuit board 5 is located between the backlight module 4 and the frame 1, and the cover plate 2 is located on the side of the liquid crystal display panel 3 away from the backlight module 4. The cover plate 2 may be, for example, a transparent glass.

Based on the liquid crystal display device shown in FIG. 1, in FIG. 1, the transmitting sequence of the light path is that the light is emitted from the backlight module 4, and then the light is transmitted through the array substrate 31, the liquid crystal layer 33, and the color filter substrate 32 in sequence, and then being emitted out of the cover plate 2.

The structure of the existing liquid crystal display device is described in detail above. However, when preparing the liquid crystal display panel 3 in the liquid crystal display device with this structure, the color filter substrate 32 and the array substrate 31 need to be prepared separately, and then the liquid crystal cell 30 is formed by coating the sealant and assembling.

Figure 2:
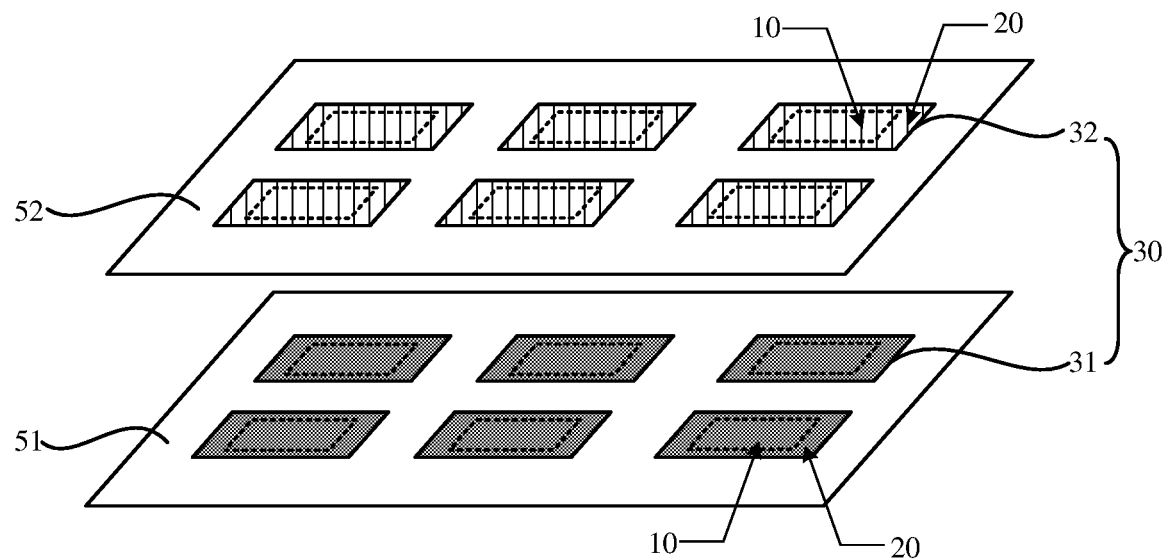
FIG. 2 is a schematic structural view of a first large plate glass and a second large plate glass.

FIG. 2 shows a schematic structural view of the first large plate glass and the second large plate glass provided in the example technology.

As shown in FIG. 2, in the manufacturing process of the liquid crystal display panel 3, firstly, preparing several array substrates 31 (in FIG. 2, taking 6 as an example) on an entire first large plate glass 51, and then preparing several color filter substrates 32 (in FIG. 2, taking 6 as an example) on another entire second large plate glass 52. Then, applying, using a coating device, a circle of sealant onto the peripheral area 20 around the display area 10 of each of the several substrates (ie, the array substrate 31 or the color filter substrate 32) of one of the large glass plates; filling the liquid crystal into the area enclosed by the sealant; aligning the first large plate glass 51 and the second large plate glass 52, and adhering a corresponding group of array substrates 31 and color filter substrates 32 by the sealant to form a liquid crystal cell 30; and then cutting out a plurality of liquid crystal display panels 3 along preset cutting line positions on the first large plate glass 51 and the second large plate glass 52.

On this basis, a layer of alignment film 40 is usually needed to be coated on the array substrates 31 and the color filter substrates 32 respectively before coating the sealant on the array substrates 31 and the color filter substrates 32. In order to simplify the process, generally, the alignment film 40 is coated on the first large plate glass 51 on which several array substrates 31 are arranged and the second large glass 52 on which several color filter substrates 32 are arranged. Then the alignment film 40 is processed using rubbing alignment (using the cloth on the outside of the drum to rub the alignment film 40 according to the mechanical principle) process, such that the alignment film 40 have the ability to align the liquid crystal molecules in a uniform direction at a certain pre-tilt angle. In this way, after the array substrate 31 and the color filter substrate 32 are aligned, the alignment film 40 is in contact with the liquid crystal in the liquid crystal layer 33, so that the liquid crystal can generate a pre-tilt angle in a certain direction, thereby providing an angle to the liquid crystal molecules. The size of the pre-tilt angle has an important influence on the driving voltage, contrast, response time, viewing angle, etc. of the liquid crystal display panel 3.

However, the above method is only applicable to the case where the alignment directions of the liquid crystals corresponding to the plurality of array substrates 31 or the color filter substrates 32 are uniform. When the liquid crystal molecules corresponding to several array substrates 31 or color filter substrates need different alignment directions, during the preparation process, a plurality of rubbing alignments in different directions are required, and the rubbing alignment can cause interference to the surrounding area. Therefore, when different alignment directions are required, the technological difficulty of rubbing alignment is greatly increased, and the rubbing alignment is no longer applicable.

Figure 3:
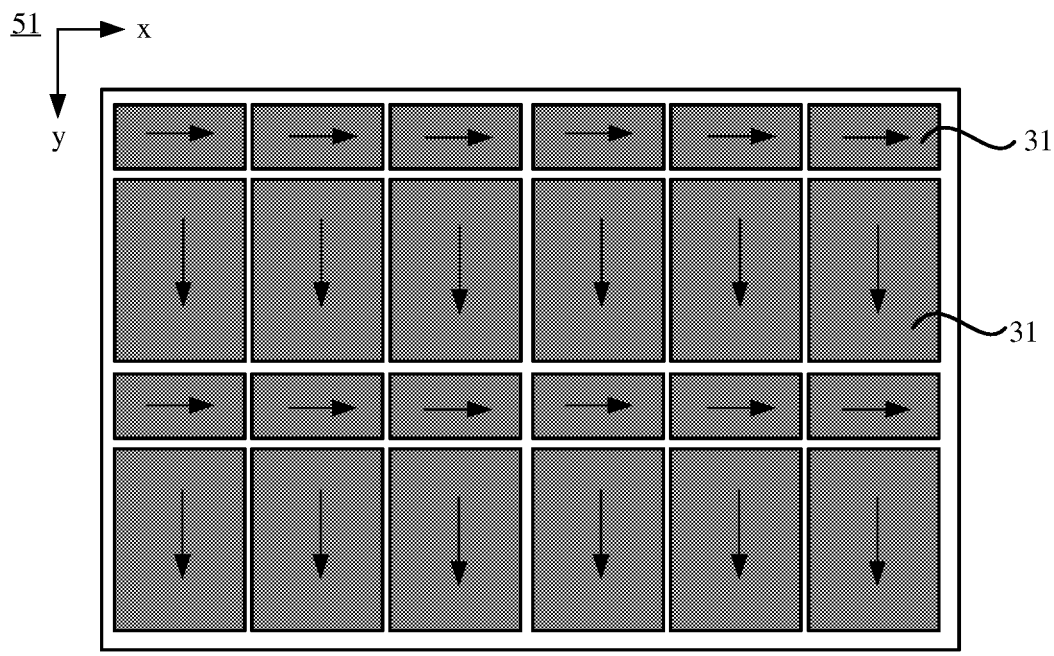
FIG. 3 is a schematic view of an arrangement of several array substrates with different alignment directions arranged on a first large plate glass.

Exemplarily, FIG. 3 shows a schematic view of the arrangement of several array substrates 31 with different alignment directions arranged on the first large plate glass 51. As shown in FIG. 3, taking the x direction as the row direction and the y direction as the column direction as shown in FIG. 3 as an example, the liquid crystals in the plurality of array substrates 31 in the first row and the third row need to be aligned along the row direction, and the liquid crystals in the plurality of array substrates 31 in the second row and the fourth row need to be aligned in the column direction. For example, if the alignment film 40 in the area corresponding to the array substrates 31 in the first row is processed to rubbing alignment, and then the alignment film 40 in the area corresponding to the array substrates 31 in the second row is processed to rubbing alignment, then the alignment film 40 that has been aligned in the area corresponding to the array substrates 31 in the first row is influenced. Similarly, when performing rubbing alignment to the several color filter substrates 32 arranged on the second large plate glass 52 in different alignment directions, there will also be mutual influenced.

Therefore, some people propose to arrange the array substrates 31 or color filter substrates 32 in the same alignment direction together, so that the first large plate glass 51 and the second large plate glass 52 can be partitioned for rubbing alignment.

Figure 4:
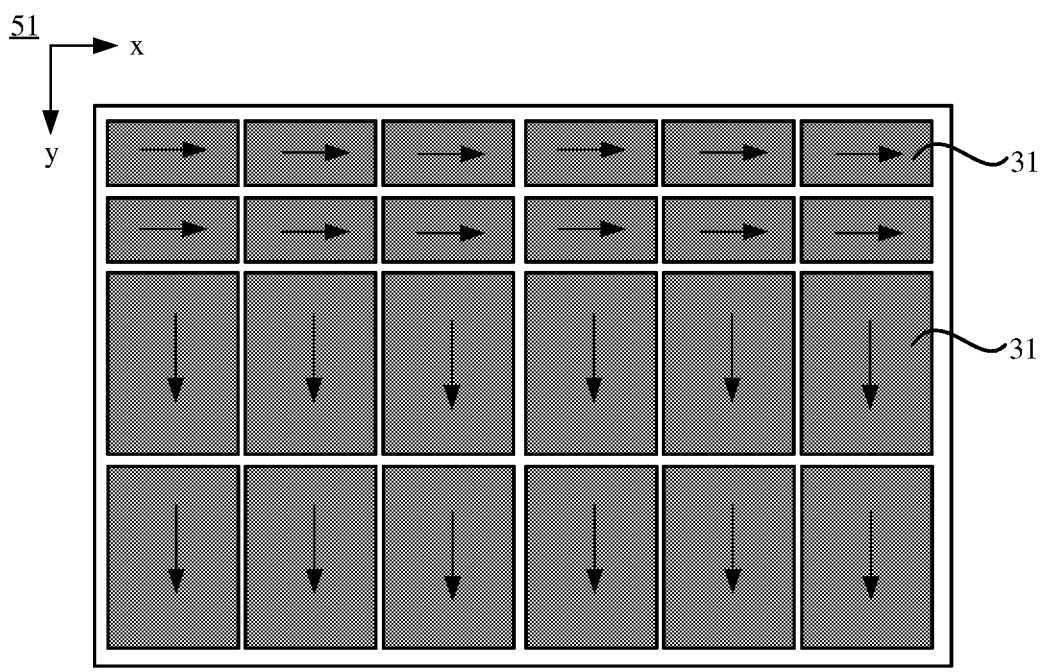
FIG. 4 is a schematic view of an arrangement of several array substrates with different alignment directions arranged on another first large plate glass.

Exemplarily, FIG. 4 shows another schematic view of the arrangement of several array substrates 31 with different alignment directions on the first large plate glass 51. As shown in FIG. 4, the positions of the array substrates 31 in the second row and the array substrates 31 in the third row in FIG. 3 are exchanged, therefore, the corresponding alignment directions of the array substrates 31 in the first row and the second row in FIG. 4 are both horizontal directions, which can form an alignment area, and the corresponding alignment directions of the array substrates 31 in the third row and the fourth row are both vertical directions, which can be form another alignment area. In this way, the alignment films 40 in the alignment areas corresponding to the array substrates 31 in the first row and the second row can be aligned in the horizontal direction at the same time, and then the alignment films 40 in the alignment areas corresponding to the array substrates 31 in the third row and the fourth row can be aligned in the vertical direction at the same time.

Although the difficulty of rubbing alignment can be reduced by changing the arrangement of the array substrates 31 as described above, when there are more than two alignment directions, the arrangement is more complicated and the arrangement may not necessarily be simplified, so the rubbing alignment is still inapplicable.

In addition, in the prior art, a process for photo alignment, and the process specifically includes: illuminating the alignment film 40 with a linearly polarized light to form an alignment microstructure with a certain tilt angle on the surface of the alignment film 40, and the alignment microstructure can induce the liquid crystal molecules to be aligned in the same direction at a certain pre-tilt angle, that is, in other words, by illuminating the alignment film 40 with the linearly polarized light, the illuminated alignment film 40 can have the alignment ability of a specific alignment direction, so that the liquid crystal molecules can be aligned in a corresponding direction subsequently.

However, in the prior art, the polarization direction of the linearly polarized light illuminated on each array substrate 31 of the first large plate glass 51 or on each color filter substrate 32 of the second large plate glass 52 is usually the same, therefore, when the liquid crystal molecules corresponding to several array substrates 31 or color filter substrates 32 need different alignment directions, the existing process for photo alignment is still inapplicable.

In view of this, an embodiment of the present application provides a device for photo alignment. By arranging the control assembly between the linearly polarized light source and the bearing platform, after placing the large plate glass to be aligned on the side of the bearing platform close to the control assembly, the control assembly can adjust the polarization direction of the first polarized light emitted by the linearly polarized light source, so as to provide the second polarized light to the plurality of alignment areas included in the large plate glass to be aligned. Since the polarization directions of the second polarized light corresponding to the at least two alignment areas are different, alignment areas corresponding to different alignment directions can be generated, therefore the control assembly can be used to achieve alignment in a plurality of directions at the same time.

Figure 5:
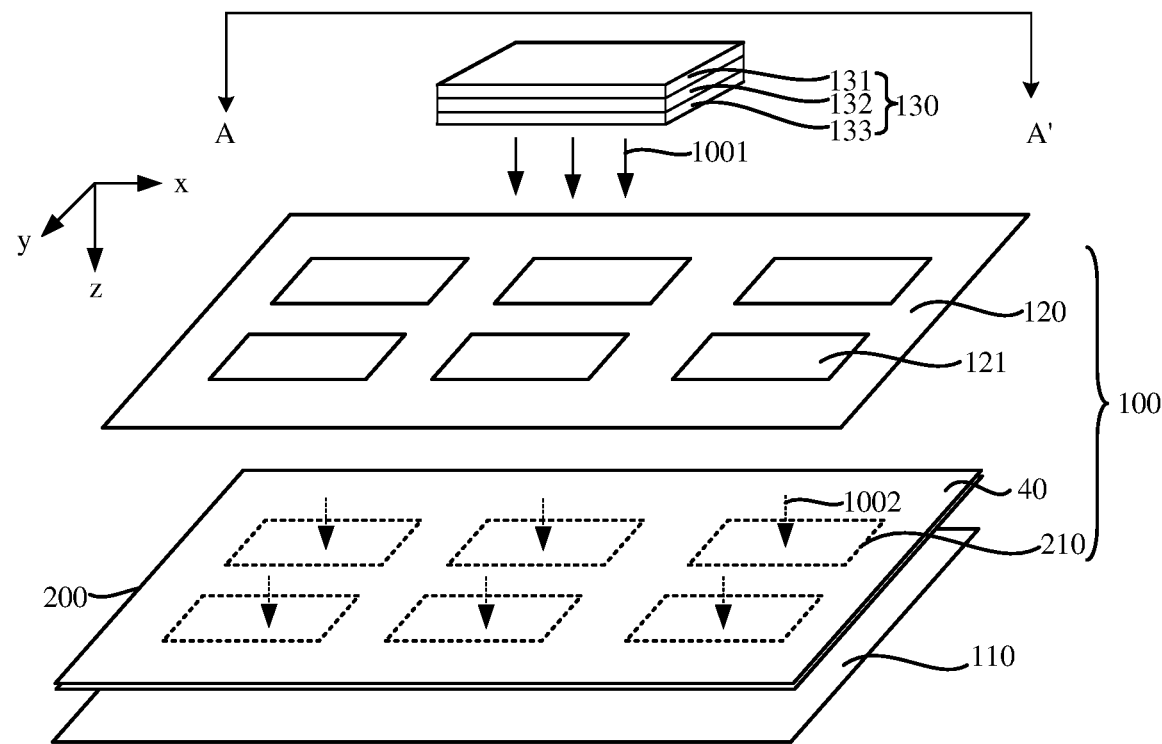
FIG. 5 is a schematic structural view of a device for photo alignment provided by an embodiment of the present application.
Figure 6:
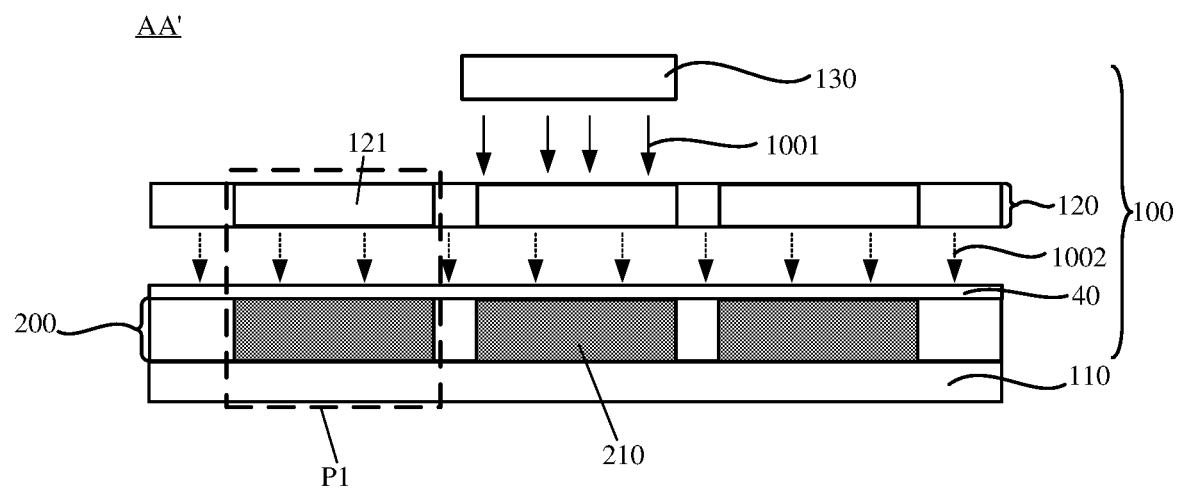
FIG. 6 is a schematic cross-sectional view of the device for photo alignment in FIG. 5 along AA' direction.
Figure 7:
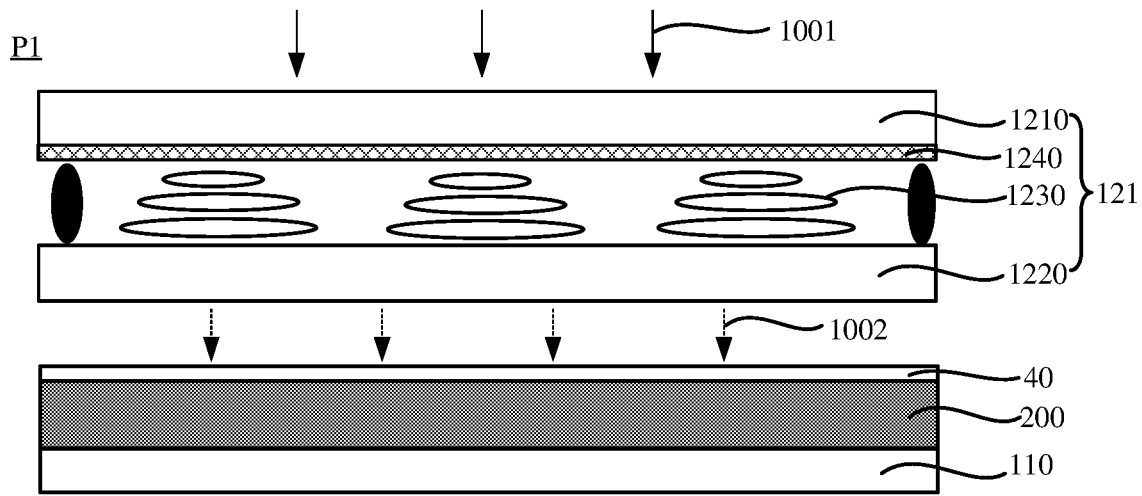
FIG. 7 is a partial enlarged view of area P1 in FIG. 6.

The structure of the device for photo alignment provided by the embodiments of the present application will be described in detail below with reference to FIGS. 5 to 10. FIG. 5 is a schematic structural view of a device for photo alignment provided by an embodiment of the present application; FIG. 6 is a schematic cross-sectional view of the device for photo alignment in FIG. 5 along the AA' direction; FIG. 7 is a partial enlarged view of the area P1 in FIG. 6.

As shown in FIGS. 5 and 6, the device 100 for photo alignment includes: a bearing platform 110, a linearly polarized light source 130 located on one side of the bearing platform 110, and a control assembly 120 located between the bearing platform 110 and the linearly polarized light source 130. The side of the bearing platform 110 close to the control assembly 120 is used for placing the large plate glass 200 to be aligned including a plurality of alignment areas 210.

The linearly polarized light source 130 is configured for providing the first polarized light to the control assembly 120.

The control assembly 120 is configured for adjusting the polarization direction of the first polarized light, and providing the second polarized light to the plurality of alignment areas 210 included in the large plate glass 200 to be aligned.

The polarization directions of the second polarized light corresponding to the at least two alignment areas 210 respectively are different.

It should be understood that, as shown in FIGS. 5 and 6, the device 100 for photo alignment is sequentially arranged with the linearly polarized light source 130, the control assembly 120 and the bearing platform 110 from top to bottom.

In order to enable the linearly polarized light source 130 to illuminate all the control assemblies 120, a first preset distance is provided between the linearly polarized light source 130 and the control assembly 120, and the first preset distance can be arranged as required. The embodiments of the present application do not impose any limitation herein.

In order to place the large plate glass 200 to be aligned on the side of the bearing platform 110 close to the control assembly 120, a second preset distance is provided between the bearing platform 110 and the control assembly 120, and the second preset distance is arranged greater than the height of the large plate glass 200 to be aligned. The second preset distance can be arranged as required, which is not limited in the embodiment of the present application.

Since some of the alignment areas 210 are disposed at the boundary of the large plate glass 200 to be aligned, in order to allow the control assembly 120 to provide the second polarized light to all the alignment areas 210 of the large plate glass 200 to be aligned, therefore, the side length of the control assembly 120 parallel to the bearing platform 110 is greater than or equal to the side length of the large plate glass 200 to be aligned parallel to the bearing platform 110. In other words, the control assembly 120 can be arranged parallel both to the bearing platform 110 and the large plate glass 200 to be aligned, and the side length of the control assembly 120 in any direction is greater than or equal to the side length of the large plate glass to be aligned in the corresponding direction. For example, the side length of the control assembly 120 parallel to the bearing platform 110 and parallel to the first direction x is greater than or equal to the side length of the large plate glass 200 to be aligned parallel to the bearing platform 110 in the same direction. The side length of the control assembly 120 parallel to the bearing platform 110 can be arranged as required, which is not limited in the embodiment of the present application.

In addition, the device 100 for photo alignment can further include a bracket for suspending the linearly polarized light source 130, and the linearly polarized light source 130 is suspended at the center of the control assembly 120 parallel to the plane of the bearing platform 110 by the bracket. That is, the projection of the linearly polarized light source 130 on the control assembly 120 is located at the center of the control assembly 120. The bearing platform 110 can also be arranged as a movable bearing platform 110, which is convenient for placing the large plate glass 200 to be aligned and taking out the large plate glass 200 to be aligned after being aligned.

It should be understood that the large plate glass 200 to be aligned is the first large plate glass 51 or the second large plate glass 52 shown in FIG. 2. Since the plurality of array substrates 31 are arranged on the first large plate glass 51, when the liquid crystal molecules corresponding to the plurality of array substrates 31 require different alignment directions (or the plurality of color filter substrates 32 are arranged on the second large plate glass 52, when the liquid crystal molecules corresponding to the plurality of color filter substrates 32 require different alignment directions), the control assembly 120 can adjust the polarization direction of the incident first polarized light as required, and generate second polarized light with different polarization directions to align the large plate glass 200 to be aligned.

For each alignment area 210, in one embodiment, the corresponding second polarized light has the same polarization direction as the first polarized light, or has a different polarization direction from the first polarized light. Among the second polarized light corresponding to the plurality of alignment areas 210, the polarization directions of the second polarized lights corresponding to at least two alignment areas 210 are different, so that the alignment areas 210 corresponding to different alignment directions can be generated.

It should be understood that the size of one alignment area 210 on the large plate glass 200 to be aligned can be greater than, equal to or smaller than the size of one array substrate 31 or the size of the color filter substrate 32.

When the array substrates 31 on the first large plate glass 51 or the color filter substrates 32 on the second large plate glass 52 are closely arranged, in order to simplify the alignment design, the gap between the array substrates 31, or between the color filter substrates 32, can be ignored. Therefore, several alignment areas can be considered to be arranged in an array on the large plate glass 200 to be aligned.

The embodiments of the present application provide a device for photo alignment, by arranging the control assembly between the linearly polarized light source and the bearing platform, after placing the large plate glass to be aligned on the side of the bearing platform close to the control assembly, the control assembly can adjust the polarization direction of the first polarized light emitted by the linearly polarized light source, so as to provide the second polarized light to the plurality of alignment areas included in the large plate glass to be aligned. Since the polarization directions of the second polarized light corresponding to the at least two alignment areas are different, alignment areas corresponding to different alignment directions can be generated, therefore the control assembly can be used to achieve alignment in a plurality of directions at the same time.

In addition, compared with the prior art, when the device for photo alignment provided by the embodiment of the present application is used for alignment, the process is simple, the time is short, the precision is high, and the work efficiency is also high.

In an embodiment, as a possible implementation manner, the side of the large plate glass 200 to be aligned close to the control assembly 120 is coated with an alignment film 40. The second polarized light is used to align the alignment film 40 located in the alignment areas 210 on the large plate glass 200 to be aligned.

Since the polarization directions of the second polarized light corresponding to the at least two alignment areas are different, the alignment films 40 corresponding to different alignment directions can be generated at different alignment areas, and the alignment films 40 with different alignment directions can perform different aligns on the liquid crystal molecules. Therefore, by using the control assembly, the purpose of aligning a plurality of directions at the same time can be achieved.

In an embodiment, as a possible implementation manner, a photosensitive agent is coated on the side of the alignment film 40 close to the control assembly 120. The photosensitive agent is used to react with the second polarized light to complete the alignment of the alignment film 40.

In an embodiment, as a possible implementation manner, a plurality of array substrates 31 are arranged on the large plate glass 200 to be aligned, and each array substrate 31 includes at least one alignment area 210; or, a plurality of color filter substrates 32 are arranged on the large plate glass 200 to be aligned, and each color filter substrate 32 includes at least one alignment area 210.

As shown in FIGS. 5 to 7, in a first example, the large plate glass 200 to be aligned is the first large plate glass 51, and the large plate glass 200 to be aligned is arranged with 6 array substrates 31, and each array substrate 31 serves as an alignment area 210, and the remaining areas are not aligned. Correspondingly, the control assembly 120 can adjust the polarization direction of the first polarized light and provide the second polarized light to the 6 alignment areas 210 included in the large plate glass 200 to be aligned. In an embodiment, at least two alignment areas 210, that is, the polarization directions of the second polarized light corresponding to the areas where the at least two array substrates 31 are located are different.

Similarly, in another embodiment, the large plate glass 200 to be aligned is the second large plate glass 52, and the large plate glass 200 to be aligned is arranged with 6 color filter substrates 32, and each color filter substrate 31 serves as an alignment area 210, and the remaining areas are not aligned. Correspondingly, the control assembly 120 can adjust the polarization direction of the first polarized light and provide the second polarized light to the 6 alignment areas 210 included in the large plate glass 200 to be aligned. In an embodiment, at least two alignment areas 210, that is, the polarization directions of the second polarized light corresponding to the areas where the at least two color filter substrates 31 are located are different.

Figure 8:
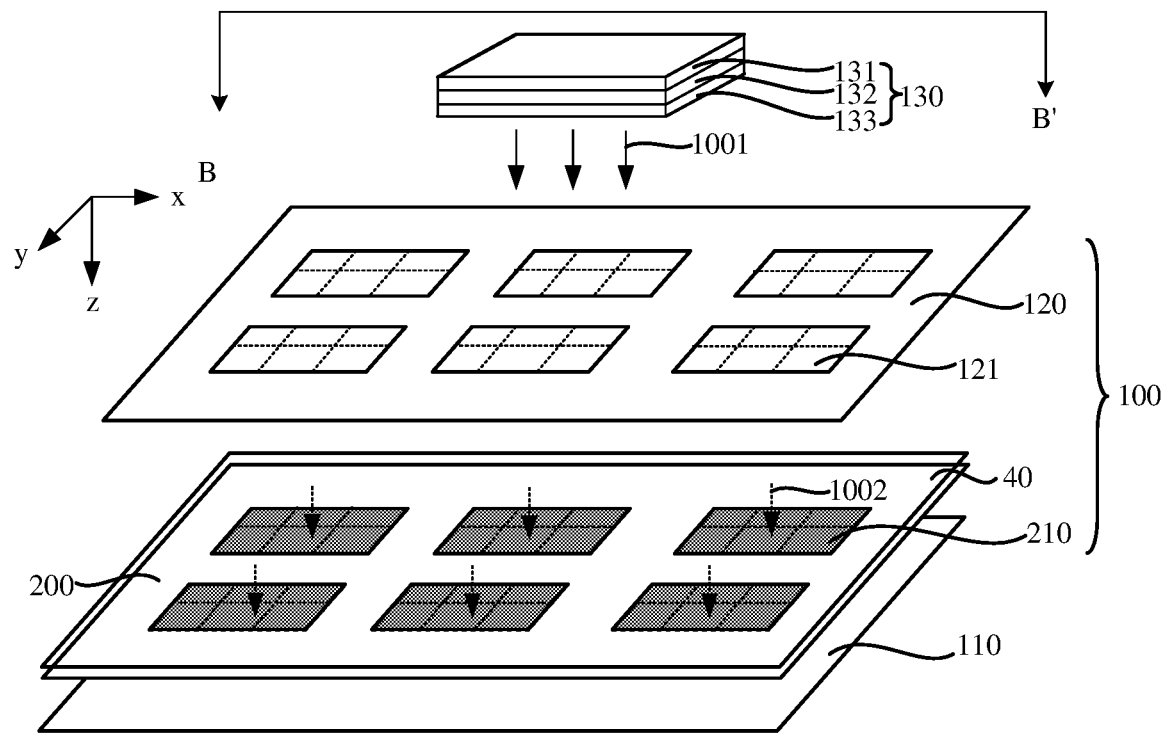
FIG. 8 is a schematic structural view of a device for photo alignment provided by an embodiment of the present application.
Figure 9:
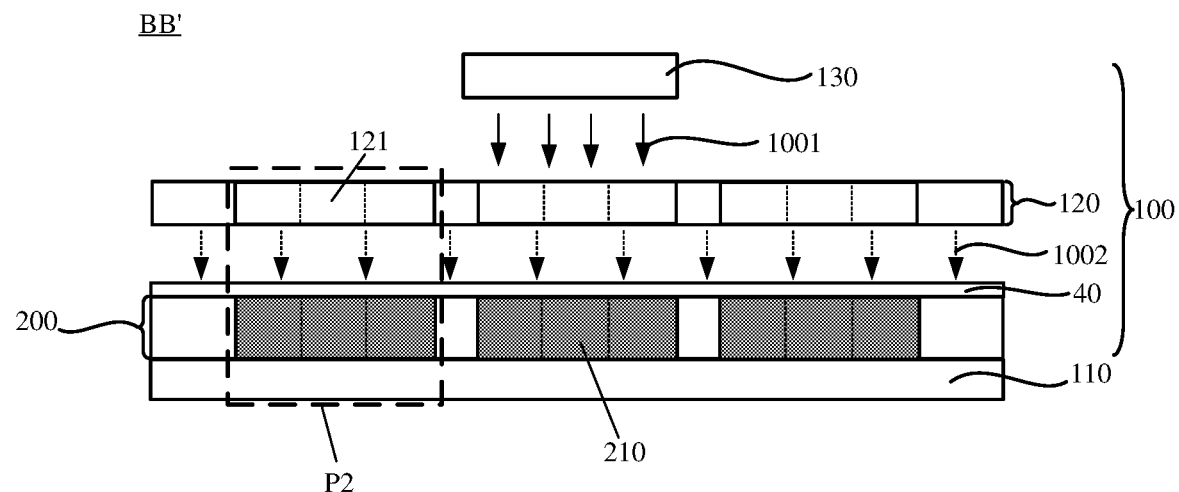
FIG. 9 is a schematic cross-sectional view of the device for photo alignment in FIG. 8 along BB' direction.

FIG. 8 is a schematic structural view of a device for photo alignment provided by an embodiment of the present application; FIG. 9 is a schematic cross-sectional view of the device for photo alignment in FIG. 8 along the direction BB'; and FIG. 10 is a partial enlarged view of the area P2 in FIG. 9.

Figure 10:
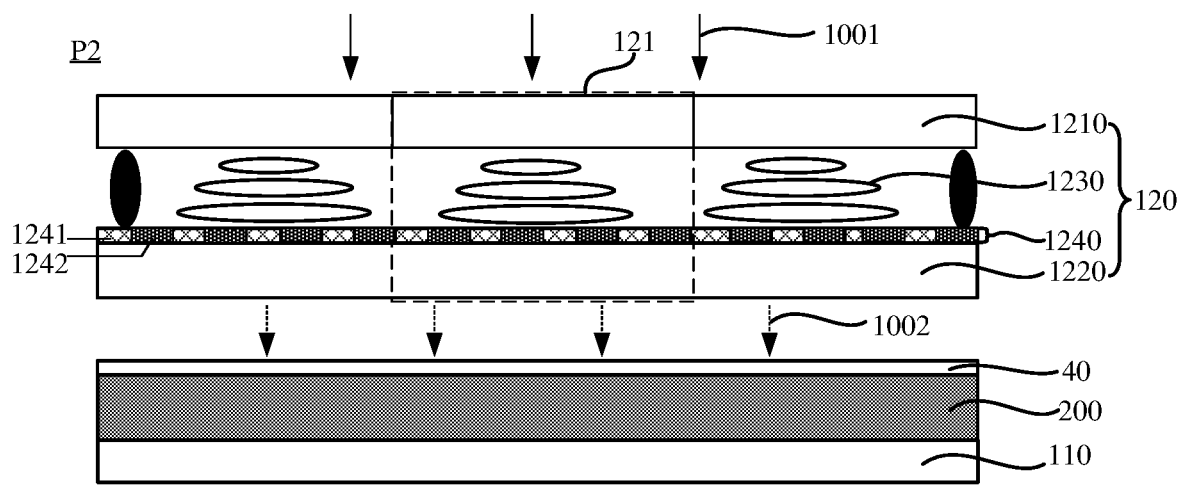
FIG. 10 is a partial enlarged view of the area P2 in FIG. 9.

As shown in FIGS. 8 to 10, in a second example, the large plate glass 200 to be aligned is the first large plate glass 51, and the large plate glass 200 to be aligned is arranged with 6 array substrates 31, and each array substrate 31 includes 6 alignment areas 210 arranged in an array, and the remaining areas are not aligned. Correspondingly, the control assembly 120 can adjust the polarization direction of the first polarized light and provide the second polarized light to the 36 alignment areas 210 included in the large plate glass 200 to be aligned. In an embodiment, at least two alignment areas 210, that is, the at least two array substrates 31 respectively include one alignment area 210, or one array substrate 31 includes at least two alignment areas 210, and the polarization directions of the corresponding second polarized light are different.

Similarly, in another embodiment, the large plate glass 200 to be aligned is the second large plate glass 52, and the large plate glass 200 to be aligned is arranged with 6 color filter substrates 32, and each color filter substrate 32 includes 6 alignment areas 210 arranged in an array, and the remaining areas are not aligned. Correspondingly, the control assembly 120 can adjust the polarization direction of the first polarized light and provide the second polarized light to the 36 alignment areas 210 included in the large plate glass 200 to be aligned. In an embodiment, at least two alignment areas 210, that is, the at least two array substrates 31 respectively include one alignment area 210, or one array substrate 31 includes at least two alignment areas 210, and the polarization directions of the corresponding second polarized light are different.

In an embodiment, as a possible implementation manner, the control assembly 120 includes a plurality of control modules 121, and the control modules 121 are in one-to-one correspondence with the alignment areas 210 on the large plate glass 200 to be aligned.

As shown in FIGS. 5 to 7, in a first example, when the large plate glass 200 to be aligned includes 6 alignment areas 210, correspondingly, the control assembly 120 includes 6 control modules 121, and each control module 121 corresponds to one alignment area 210, and each control module 121 is disposed directly above the corresponding alignment area 210. In an embodiment, the side length of the control module 121 parallel to the bearing platform 110 is greater than or equal to the side length of the alignment area 210 parallel to the bearing platform 110.

As shown in FIGS. 8 to 10, in a second example, when the large plate glass 200 to be aligned includes 36 alignment areas 210, correspondingly, the control assembly 120 may include 36 control modules 121, and each control module 121 corresponds to one alignment area 210. In an embodiment, each control module 121 is disposed directly above the corresponding alignment area 210.

It should be understood that the number, shape, size and position of the alignment areas 210 can be arranged as required, and correspondingly, the number, shape, size and position of the control modules 121 are changed accordingly, which is not limited in the embodiment of the present application.

The control module 121 is used to adjust the polarization direction of the first polarized light in the corresponding alignment area 210 to form the second polarized light. That is, each control module 121 adjusts the alignment direction of one alignment area 210. Thus, by adjusting the polarization directions of the first polarized light in the corresponding alignment areas 210 through different control modules 121, the second polarized light with different polarization directions can be generated.

It should be understood that, since each control module 121 can precisely control the polarization direction of the first polarized light illuminated on one alignment area 210 on the large plate glass 200 to be aligned, therefore, the requirement of configuring different liquid crystal alignment directions in the areas corresponding to the array substrates 31 or the color filter substrates 32 on the large plate glass 200 to be aligned can be achieved by adjusting the plurality of control modules 121.

Based on this, the control accuracy can be improved by reducing the size of the control modules 121 and increasing the number of the control modules 121, thereby the alignment requirements of various complex situations of various substrates can meet.

It should also be understood that since each control module 121 adjusts the alignment direction of one alignment area 210, therefore all the control modules 121 included in the control assembly 120 can adjust the alignment directions of all the alignment areas 210 at the same time, which will not increase additional process time when compared to the prior art.

In an embodiment, as a possible implementation manner, as shown in FIGS. 7 and 10, each control module 121 includes: a first substrate 1210 and a second substrate 1220 arranged opposite to each other, and an alignment liquid crystal layer 1230 located between the first substrate 1210 and the second substrate 1220, and the first substrate 1210 is parallel to the bearing platform 110.

It should be understood that since the first substrate 1210 and the second substrate 1220 are disposed opposite to each other, therefore when the first substrate 1210 is parallel to the bearing platform 110, the second substrate 1220 is also parallel to the bearing platform 110. Moreover, both the first substrate 1210 and the second substrate 1220 are parallel to the large plate glass 200 to be aligned and the alignment film 40 coated on the large plate glass 200 to be aligned.

In an embodiment, the positions of the first substrate 1210 and the second substrate 1220 in each control module 121 can be interchanged, that is, the first substrate 1210 can be disposed on the side of the control module 121 close to the bearing table 110, and the second substrate 1220 can be disposed on the side of the control module 121 close to the linearly polarized light source 130, or, the first substrate 1210 may be disposed on the side of the control module 121 close to the linearly polarized light source 130, and the second substrate 1220 may be disposed on the side of the control module 121 close to the bearing platform 110.

An alignment electrode layer 1240 is provided on the side of the first substrate 1210 close to the alignment liquid crystal layer 1230 or on the side of the second substrate 1210 close to the alignment liquid crystal layer 1230, and the alignment electrode layer 1240 is used to supply voltage to the alignment liquid crystal layer 1230, The voltage is used to control the liquid crystal in the alignment liquid crystal layer 1230 to rotate, and the rotated liquid crystal is used to adjust the polarization direction of the first polarized light.

It should be understood that the alignment electrode layer 1240 is disposed on the side of the first substrate 1210 close to the alignment liquid crystal layer 1230, and the arrangement sequence in the control module 121 from top to bottom or from bottom to top is: the first substrate 1210, the alignment electrode layer 1240, the alignment liquid crystal layer 1230, and the second substrate 1220.

An alignment electrode layer 1240 is disposed on the side of the second substrate 1220 close to the alignment liquid crystal layer 1230, and the arrangement sequence in the control module 121 from top to bottom or bottom to top is: the first substrate 1210, the alignment liquid crystal layer 1230, the alignment electrode layer 1240, and the second substrate 1220.

In an embodiment, as a possible implementation manner, the alignment electrode layer 1240 includes: a first electrode 1241 and a second electrode 1242 arranged at intervals; and the first electrode 1241 and the second electrode 1242 are both parallel to the bearing platform 110.

The first electrode 1241 is used for supplying a first voltage to the alignment liquid crystal layer 1230, and the second electrode 1242 is used for supplying a second voltage to the alignment liquid crystal layer 1230.

It should be understood that the voltage difference between the first voltage provided by the first electrode 1241 and the second voltage provided by the second electrode 1242 can change the degree of rotation of the liquid crystal in the alignment liquid crystal layer, thereby changing the polarization direction of the first polarization.

Figure 11:
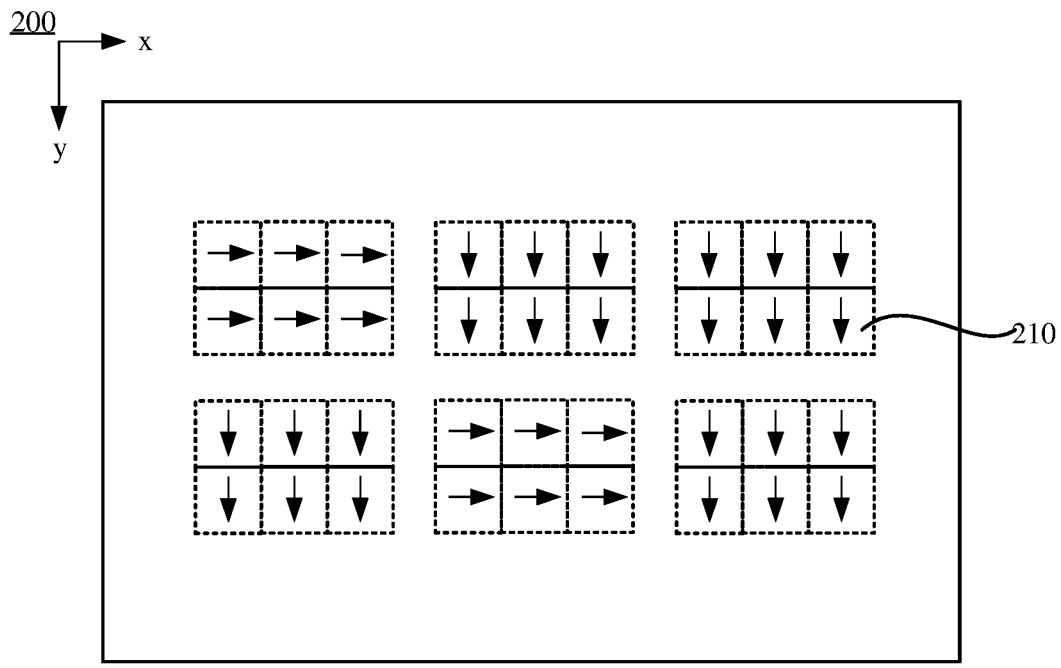
FIG. 11 is a schematic view of the arrangement of alignment areas in several different alignment directions on the large plate glass to be aligned in FIGS. 8 to 10.

Exemplarily, FIG. 11 is a schematic view of the arrangement of alignment areas in different alignment directions on the large plate glass to be aligned in FIGS. 8 to 10. The large plate glass 200 to be aligned is provided with two rows and three columns of array substrates 31, and the areas where each of the array substrates 31 are located corresponds to two rows and three columns of alignment areas 210.

As shown in FIG. 11, assuming that the polarization direction of the first polarized light is along the x direction, the long axis of the liquid crystal in the alignment liquid crystal layer 1240 extends along the x direction. Based on this, when the first electrodes 1241 and the second electrodes 1242 disposed at the positions of the alignment areas 210 corresponding to the array substrates 31 in the first row and the first column, and the second row and the second column are not supplied with voltage, and the corresponding liquid crystal rotates, and at this time, the polarization direction of the second polarized light emitted is the same as the polarization direction of the first polarized light, which is the x direction. When the first electrodes 1241 and the second electrodes 1242 disposed at the positions of the alignment areas 210 corresponding to the first row and second column, first row and third column, second row and first column, and second row and third column of the array substrate 31 are supplied with voltage, and the corresponding liquid crystal rotates, supposing a 90-degree rotation occurs. At this time, the polarization direction of the second polarized light is perpendicular to the polarization direction of the first polarized light, which is the y direction.

It should be understood that the first electrode 1241 and the second electrode 1242 can also be arranged in layers. For example, the first electrode 1241 is similar to the common electrode in the array substrates 31 and can be laid in a whole layer. While the second electrode 1242 is arranged on the side of the first electrode 1241 close to the liquid crystal layer, which is similar to the pixel electrodes in the array substrate 31, and the pixel electrodes are arranged at intervals.

It should be understood that the alignment electrode layer may also include other guiding wires connected to the first electrode 1241 and the second electrode 1242 for transmitting the external voltage to the corresponding first electrode 1241 and the second electrode 1242 at each position of the alignment areas.

In an embodiment, as a possible implementation manner, the linearly polarized light source 130 includes: an ultraviolet light source 131, a filter 132, and a polarizer 133 that are stacked in sequence. The polarizer 132 is located on the side of the ultraviolet light source 131 close to the control assembly 120.

That is to say, as shown in FIGS. 5 and 8, in the linearly polarized light source 130, the ultraviolet light source 131, the filter 132, and the polarizer 133 are arranged in sequence from top to bottom.

The filter 132 is used for filtering the ultraviolet light with a preset wavelength in the ultraviolet light provided by the ultraviolet light source 131, and the polarizer is used for converting the filtered ultraviolet light into the first polarized light.

The filter 132 filters out some unwanted light, and leaves light with a specified wavelength to meet actual alignment requirements. The preset wavelength of the filtered ultraviolet light can be arranged as required, which is not limited in the embodiments of the present application. For example, the filter 132 can filter out ultraviolet light with wavelengths other than 240-370 nm.

In the linearly polarized light source 130, other devices such as a lampshade, a light guide plate and the like can also be provided to make full use of the first polarized light.

Figure 12:
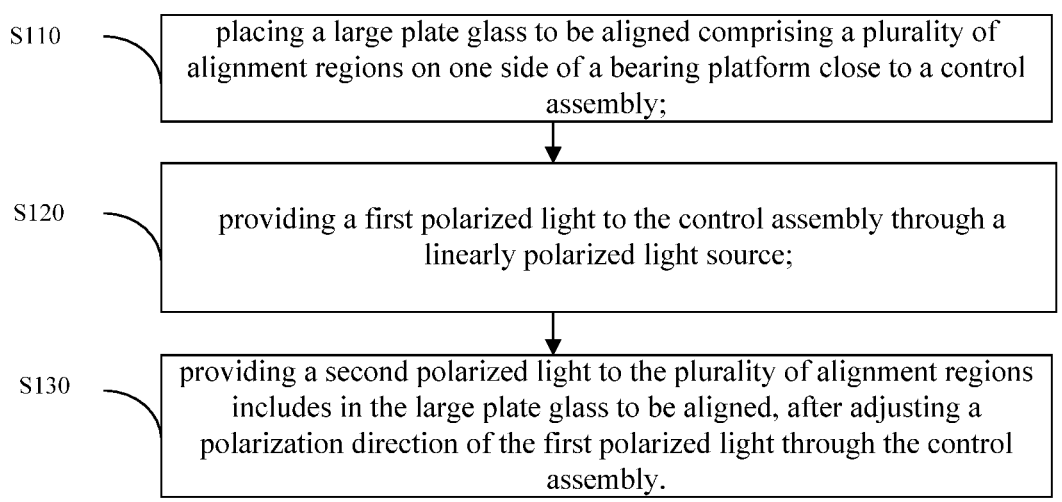
FIG. 12 is a schematic flowchart of a method for photo alignment provided by an embodiment of the present application.

The structure of the device 100 for photo alignment provided by the embodiments of the present application has been described above, and the following describes a method for photo alignment corresponding to the device for photo alignment based on the device for photo alignment. FIG. 12 is a schematic flowchart of a method for photo alignment provided by an embodiment of the present application.

As shown in FIG. 12, the method 1200 for photo alignment includes the following steps S110 to S130.

S110, placing a large plate glass to be aligned comprising a plurality of alignment areas on one side of a bearing platform close to a control assembly.

If the bearing platform is large, a plurality of pieces of large plate glass to be aligned can be placed on the bearing platform at the same time, and the alignment is performed at the same time, so as to improve the work efficiency.

S120, providing a first polarized light to the control assembly through a linearly polarized light source.

S130, providing a second polarized light to the plurality of alignment areas includes in the large plate glass to be aligned, after adjusting a polarization direction of the first polarized light through the control assembly.

The polarization directions of the second polarized light respectively corresponding to at least two alignment areas are different.

When the control assembly includes a plurality of control modules, since the control modules are in one-to-one correspondence with the alignment areas on the large plate glass to be aligned, each control module can be adjusted to change the polarization directions of the first polarized light at the corresponding positions of the alignment areas, so as to form second polarized light with a different polarization directions.

The embodiment of the present application provides a method for photo alignment method. By arranging the control assembly between the linearly polarized light source and the bearing platform, after placing the large plate glass to be aligned on the side of the bearing platform close to the control assembly, the control assembly can adjust the polarization direction of the first polarized light emitted by the linearly polarized light source, so as to provide the second polarized light to the plurality of alignment areas included in the large plate glass to be aligned. Since the polarization directions of the second polarized light corresponding to the at least two alignment areas are different, alignment areas corresponding to different alignment directions can be generated, therefore the control assembly can be used to achieve alignment in a plurality of directions at the same time.

In addition, compared with the prior art, when the device for photo alignment provided by the embodiment of the present application is used for alignment, the process is simple, the time is short, the precision is high, and the work efficiency is also high.

In an embodiment, as a possible implementation method, the side of the large plate glass to be aligned close to the control assembly is coated with an alignment film. The second polarized light aligns the alignment film located in the alignment area on the large plate glass to be aligned.

Since the polarization directions of the second polarized light corresponding to the at least two alignment areas are different, alignment films corresponding to different alignment directions can be generated at the positions of the different alignment areas, therefore the control assembly can be used to achieve alignment in a plurality of directions at the same time.

Embodiments of the present application further provide a computer-readable storage medium, where computer programs or instructions are stored in the computer-readable storage medium, and when a computer reads and executes the computer programs or instructions, the computer executes the method 1200 for photo alignment.

The beneficial effects of the computer-readable storage medium provided by the embodiments of the present application are the same as the beneficial effects corresponding to the above-mentioned method 1200 for photo alignment, and details are not described herein again.

The above-mentioned embodiments are only used to illustrate the technical solutions of the present application, but not to limit the present application; although the present application has been described in detail with reference to the above-mentioned embodiments, those skilled in the art should understand that: it is still possible to modify the technical solutions recorded in the foregoing embodiments, or perform equivalent replacements to some of the technical features; and these modifications or replacements do not make the essence of the corresponding technical solutions deviate from the spirit of the technical solutions in the embodiments of the present application, and shall be included within the protection scope of the present application.

What is claimed is:

1. A device for photo alignment, comprising:
a bearing platform;
a linearly polarized light source located at one side of the bearing platform; and
a control assembly located between the linearly polarized light source and the bearing platform;
wherein one side of the bearing platform close to the control assembly is configured for placing a large plate glass to be aligned, and the large plate glass to be aligned comprising a plurality of alignment areas;
wherein the linearly polarized light source is configured for providing a first polarized light to the control assembly; the control assembly is configured for adjusting a polarization direction of the first polarized light, and configured for providing a second polarized light to the plurality of alignment areas comprised in the large plate glass to be aligned;
wherein polarization directions of the second polarized light respectively corresponding to at least two alignment areas are different;
wherein the control assembly comprises a plurality of control modules, and the control modules and the alignment areas on the large plate glass to be aligned are in one-to-one correspondence; and
the control modules are configured for adjusting the polarization direction of the first polarized light corresponding to the alignment areas to form the second polarized light.

2. The device for photo alignment according to claim 1, wherein one side of the large plate glass to be aligned close to the control assembly is coated with an alignment film; and
the second polarized light is configured for aligning the alignment film located in the alignment areas on the large plate glass to be aligned.

3. The device for photo alignment according to claim 1, wherein a plurality of array substrates is arranged on the large plate glass to be aligned, and each array substrate comprises at least one alignment area; or
a plurality of color filter substrates is arranged on the large plate glass to be aligned, and each color filter substrate comprises at least one alignment area.

4. The device for photo alignment according to claim 1, wherein each control module comprises: a first substrate and a second substrate that are oppositely arranged, and an alignment liquid crystal layer located between the first substrate and the second substrate, the first substrate being parallel to the bearing platform; and
an alignment electrode layer is provided on one side of the first substrate close to the alignment liquid crystal layer, or on one side of the second substrate close to the alignment liquid crystal layer, the alignment electrode layer is configured for supplying a voltage to the alignment liquid crystal layer, and the voltage is configured for controlling a liquid crystal in the alignment liquid crystal layer to rotate, and a rotated liquid crystal is configured for adjusting the polarization direction of the first polarized light.

5. The device for photo alignment according to claim 4, wherein the alignment electrode layer comprises:
- a first electrode and a second electrode arranged at intervals, the first electrode and the second electrode are both parallel to the bearing platform; and
- the first electrode is configured for supplying a first voltage to the alignment liquid crystal layer, and the second electrode is configured for supplying a second voltage to the alignment liquid crystal layer.

6. The device for photo alignment according to claim 1, wherein the linearly polarized light source comprises: an ultraviolet light source, a filter, and a polarizer that are stacked in sequence; and the polarizer is located on one side of the ultraviolet light source close to the control assembly; and
- the filter is configured for filtering an ultraviolet light with a preset wavelength in the ultraviolet light provided by the ultraviolet light source, and the polarizer is configured for converting a filtered Ultraviolet light into the first polarized light.

7. The device for photo alignment according to claim 1, wherein a first preset distance is provided between the linearly polarized light source and the control assembly.

8. The device for photo alignment according to claim 1, wherein a second preset distance is provided between the bearing platform and the control assembly.

9. The device for photo alignment according to claim 1, wherein the control assembly is parallel to the bearing platform and the large plate glass to be aligned, and a side length of the control assembly along any direction is greater than or equal to a side length of the large plate glass to be aligned in a corresponding direction.

10. The device for photo alignment according to claim 1, wherein a projection of the linearly polarized light source on the control assembly is located at a center of the control assembly.

11. The device for photo alignment according to claim 2, wherein a photosensitive agent is coated on a side of the alignment film close to the control assembly.

12. A method for photo alignment, applied to a device for photo alignment, the device for photo alignment comprising:
- a bearing platform;
- a linearly polarized light source, located at one side of the bearing platform; and
- a control assembly, located between the linearly polarized light source and the bearing platform;
- wherein one side of the bearing platform close to the control assembly is configured for placing a large plate glass to be aligned, and the large plate glass to be aligned comprising a plurality of alignment areas;
- wherein the linearly polarized light source is configured for providing a first polarized light to the control assembly; the control assembly is configured for adjusting a polarization direction of the first polarized light, and configured for providing a second polarized light to the plurality of alignment areas comprised in the large plate glass to be aligned;
- wherein polarization directions of the second polarized light respectively corresponding to at least two alignment areas are different;
- wherein the control assembly comprises a plurality of control modules, and the control modules and the alignment areas on the large plate glass to be aligned are in one-to-one correspondence; and
- the control modules are configured for adjusting the polarization direction of the first polarized light corresponding to the alignment to form the second polarized light and the method comprises:
- placing a large plate glass to be aligned comprising a plurality of alignment areas on one side of a bearing platform close to a control assembly;
- providing a first polarized light to the control assembly through a linearly polarized light source; and
- providing a second polarized light to the plurality of alignment areas comprised in the large plate glass to be aligned, after adjusting a polarization direction of the first polarized light through the control assembly;
- wherein polarization directions of the second polarized light respectively corresponding to at least two alignment areas are different.

13. The method for photo alignment according to claim 12, wherein an alignment film is coated on one side of the large plate glass to be aligned close to the control assembly;
- performing aligning at the alignment film located in the alignment areas on the large plate glass to be aligned through the second polarized light.

* * * * *